US009154846B2

(12) United States Patent
Limbasia

(10) Patent No.: US 9,154,846 B2
(45) Date of Patent: Oct. 6, 2015

(54) COORDINATED MULTI-MEDIA PLAYBACK

(75) Inventor: Sunil Limbasia, Irving, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1809 days.

(21) Appl. No.: 11/852,617

(22) Filed: Sep. 10, 2007

(65) Prior Publication Data

US 2009/0070834 A1    Mar. 12, 2009

(51) Int. Cl.

| H04N 7/18 | (2006.01) |
|---|---|
| H04N 21/482 | (2011.01) |
| H04N 7/173 | (2011.01) |
| H04N 21/2365 | (2011.01) |
| H04N 21/2368 | (2011.01) |
| H04N 21/2389 | (2011.01) |
| H04N 21/434 | (2011.01) |
| H04N 21/4385 | (2011.01) |
| H04N 21/472 | (2011.01) |
| H04N 21/262 | (2011.01) |

(52) U.S. Cl.
CPC ....... *H04N 21/4825* (2013.01); *H04N 7/17318* (2013.01); *H04N 21/2365* (2013.01); *H04N 21/2368* (2013.01); *H04N 21/2389* (2013.01); *H04N 21/4341* (2013.01); *H04N 21/4347* (2013.01); *H04N 21/4385* (2013.01); *H04N 21/472* (2013.01); *H04N 21/26258* (2013.01)

(58) Field of Classification Search
CPC ................................................ H04N 21/26258
USPC ....................................................... 725/80, 81
See application file for complete search history.

(56) References Cited

U.S. PATENT DOCUMENTS

| 6,630,963 | B1* | 10/2003 | Billmaier ...................... 348/485 |
| 7,533,224 | B2* | 5/2009 | Takashima .................... 711/154 |
| 2004/0242269 | A1* | 12/2004 | Fadell ......................... 455/556.2 |
| 2004/0252400 | A1* | 12/2004 | Blank et al. ..................... 360/70 |
| 2006/0002681 | A1* | 1/2006 | Spilo et al. ...................... 386/46 |
| 2006/0080408 | A1* | 4/2006 | Istvan et al. ................... 709/219 |
| 2008/0196575 | A1* | 8/2008 | Good .......................... 84/470 R |

* cited by examiner

*Primary Examiner* — Nasser Goodarzi
*Assistant Examiner* — Michael Hong

(57) ABSTRACT

A request is received for playback of a package of media files, the package of media files including at least a first set of media files of a first type and a second set of media files of a second type. The first set of media files and the second set of media files are retrieved via a network. The package of media files is provided to a media playback device such that at least some of the first set of media files are played generally simultaneously as at least some of the second set of media files.

20 Claims, 3 Drawing Sheets

COORDINATED MULTI-MEDIA PLAYBACK

BACKGROUND INFORMATION

Presently, many telecommunications customers receive video content via a content processing device, such as a set top box (STB). Often, such telecommunications customers access a data network for receiving data services, e.g., the Internet, and/or may also operate a network, e.g., a wireless local area network (LAN) for data communications within the customer premises. Further, content processing devices such as STBs are often connected to media playback devices such as high-definition televisions, stereos, and the like that are designed for enhanced playback of many forms of media content, including any combination of images, audio, video, etc.

Telecommunications customers may access a variety of multimedia files, e.g. images, audio, video, etc. through a network for playback through a content processing device such as an STB. Various multimedia files may be appropriate for playback with each other, e.g., a set of image files may be appropriate for playback or accompaniment by one or more audio files. However, telecommunications customers unfortunately at present have no easy and efficient way in which to play different files or sets of files of multimedia content together utilizing any available media playback device, e.g., television sets, stereo receivers, etc., that are connected to content processing devices such as an STB.

DETAILED DESCRIPTION OF THE PREFERRED EMBODIMENTS

Figure 1:
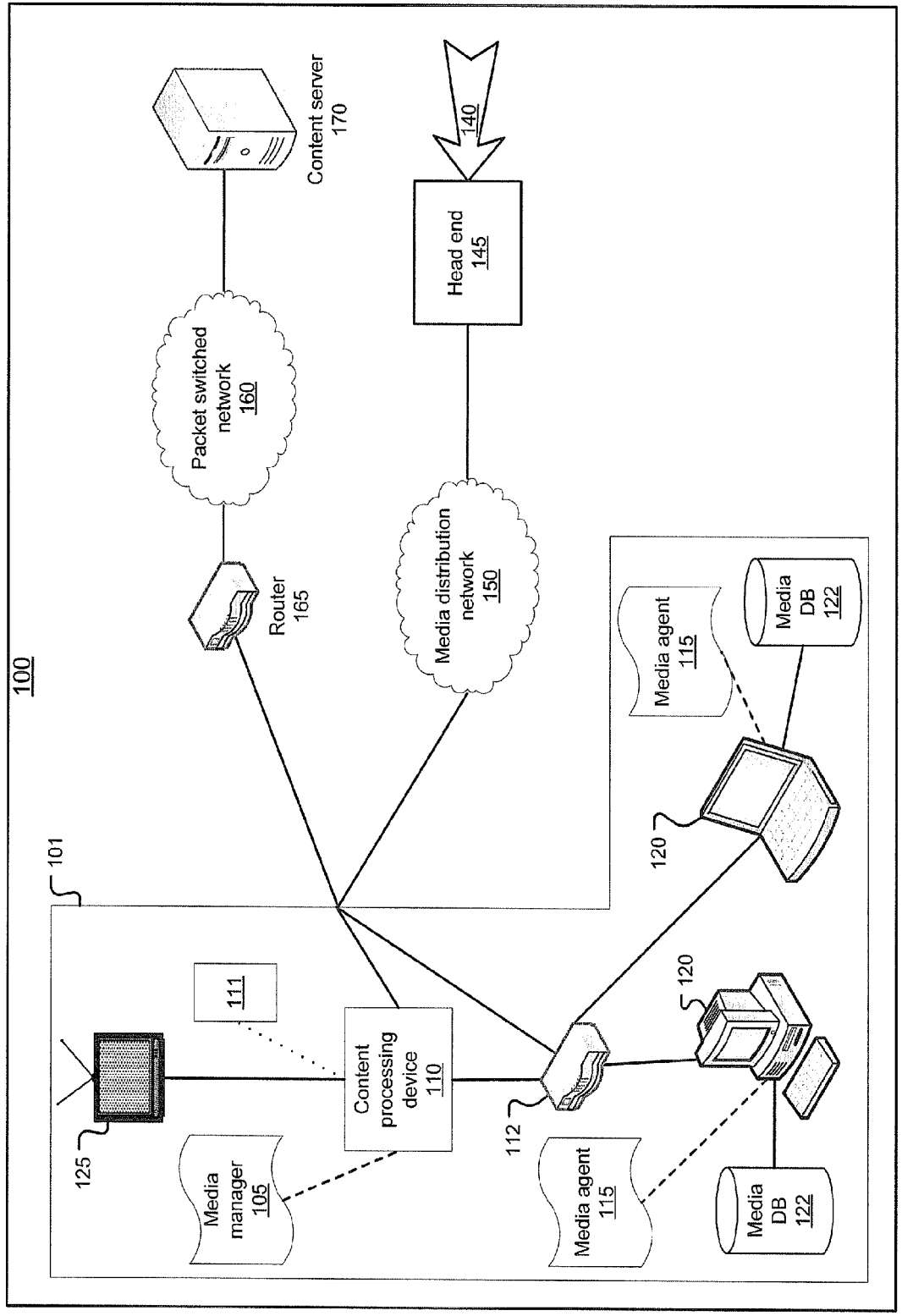
FIG. 1 illustrates an exemplary system that includes a customer premises network in which user-selected multimedia content such as images and sound may be provided through to a media playback device through a content processing device attached to the customer premises network.

FIG. 1 illustrates an exemplary system 100 that includes a customer premises network 101 in which user-selected media content, including any combination of images, audio, video, etc., may be provided to a media playback device 125 through a content processing device 110 attached to the customer premises network 101.

As illustrated in FIG. 1, customer premises network 101 includes devices within a customer premises including content processing device 110. Content processing device 110 may be a set top box (STB) or similar device that receives a media signal from a network and for providing media programming, e.g., audio, video, etc., to a media playback device 125. Content processing device 110 may be controlled by a user through a control 111, thereby facilitating the selection and playing of content through media playback device 125. An example of content processing device 110 is set top box model DCT6416 made by Motorola, Inc. of Schaumburg, Ill.

A media manager 105, which runs on content processing device 110, includes computer-executable instructions that are generally stored in a computer-readable medium, e.g., a memory, of content processing device 110, and that may be executed by a processor included within content processing device 110. A process for using media manager 105 is discussed below with reference to FIG. 4. In general, media manager 105 allows a user of content processing device 110 and media playback device 125 to access and thereby view and/or listen to media content that is stored in a media database 122 associated with a computing device 120. Media database 122 may include files, data any relational database, or some other mechanism for storing data, and may be included on a medium within computing device 120, or may be included in a separate computing device connected to or in communication with computing device 120. Media database 122 is discussed in further detail below with respect to FIG. 2. Media manager 105, and certain other elements mentioned herein, such as a media agent 115, are discussed in further detail in co-pending U.S. application Ser. No. 11/612,650 entitled "MEDIA MANAGER," the contents of which co-pending application are hereby incorporated herein by reference in their entirety.

Control 111 is generally a remote control that selectively communicating with content processing device 110 through wireless communications, such as infrared (IR) communications. Control 111 generally includes numeric keys for selecting channels of video programming, as well as other keys for making selections and requests according to menus displayed on computing device 120, in addition to arrow keys and the like for selecting channels and items in a menu, changing volume levels, etc.

A router 112 is used for establishing and operating, or at least connecting to, a network such as a home network or local area network (LAN), and is used to route communications within customer premises network 101. Significantly, router 112 provides for connection not only of one or more computing devices 120, but also allows for connection of content processing device 110. For example, content processing device 110 may be a set-top box connected to router 112 by a coaxial cable, while computing devices 120 may be connected to router 112 using a wireless connection or a hard-wired connection (e.g., a network cable such as a "Cat5" cable, or the like). Further, content processing device 110 and computing device 120 are uniquely identified by router 112. For example, Dynamic Host Configuration Protocol (DHCP) may be used to dynamically assign "private" DHCP Internet Protocol (IP) addresses to content processing device 110 and computing devices 120, i.e., IP addresses that are only accessible to devices such as devices 110 and 120 that are on customer premises network 101, i.e., directly connected to router 112.

Media playback device 125 may include a variety of equipment alone or in combination, such as a video receiver, including a conventional television or a hi-definition television (HDTV), audio equipment including an amplifier and speakers, or devices that incorporate the capability to simultaneously process both video and audio data, etc. Media playback device 125 may be connected to, and receive multimedia content from, content processing device 110.

Media agent 115 is generally included within a computing device 120. Media agent 115 includes computer-executable instructions that are generally stored in a computer-readable medium, e.g., a magnetic disk, of computing device 120, and that may be executed by a processor included within computing device 120. Media agent 115 selectively communicates with media manager 105 through a LAN or the like within customer premises 101, e.g., through router 101.

A media distribution network 150 is a network for providing media transmissions, e.g., an audio, video, or combined audio-video media signal 140. For example, network 150 may include hardware and software for providing media signal 140 via coaxial cable and/or fiber optic cable. Media signal 140 is generally provided to a media distribution network 150 from a head end 145.

A packet switched network 160 may provide further mechanism for communications to and from customer premises 101. Packet switched network 160 is generally an internet protocol (IP) network. As such, network 160 generally uses one or more protocols for transporting data, such as user datagram protocol (UDP), transport control protocol (TCP), hypertext transfer protocol (HTTP), etc. Further, network 160 may include a variety of networks such as a wide area network (WAN), e.g., the Internet, a local area network (LAN), etc. Packet switched network 160 may be used to transport a variety of data, including multimedia data such as audio data and video data. Accordingly, networks 150 and 160 could be combined into a single network, or media distribution network 150 could be simply omitted from system 100, whereby packet switched network 160 may be used to provide media signal 140 to content processing device 110.

A gateway router 165 allows content processing device 110 to access packet switched network 160. By communicating with router 165, content processing device 110 is able to obtain a network address such as an internet protocol (IP) address, thereby allowing content processing device 110 to make requests to, and to receive data from, one or more contents servers 170 (one content server 170 is shown in FIG. 1).

Content server 170 may provide a variety of features, such as video on demand (VOD), an interactive program guide (IPG), etc. An interactive program guide allows viewers of device 125 to obtain information and to select content, generally by navigating and making selections using control device 111. Server 170 generally includes a processor and a memory, as well as a computer readable medium such as a disk for storing data, e.g., interactive program guide data, to be provided to content processing device 110. Server 170 may further provide media manager 105 for download to content processing device 110.

Computing devices such as content processing device 110, computing device 120, etc. may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices, including, without limitation, a computer workstation, a desktop, notebook, laptop, or handheld computer, or some other computing device.

Content processing device 110 generally is a specialized device for receiving video signals 140 from head end 145 via network 150, and may be provided with a proprietary or specialized operating system other than those enumerated above. For example, content processing device 110 may be an STB provided with a real time operating system (RTOS). However, it is to be understood that content processing device 110 may be a computing device such as one of those enumerated above, so long as the computing device is capable of receiving video signals 140 from network 150, and also is capable of storing an executing the instructions included in media manager 105.

Computing devices generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
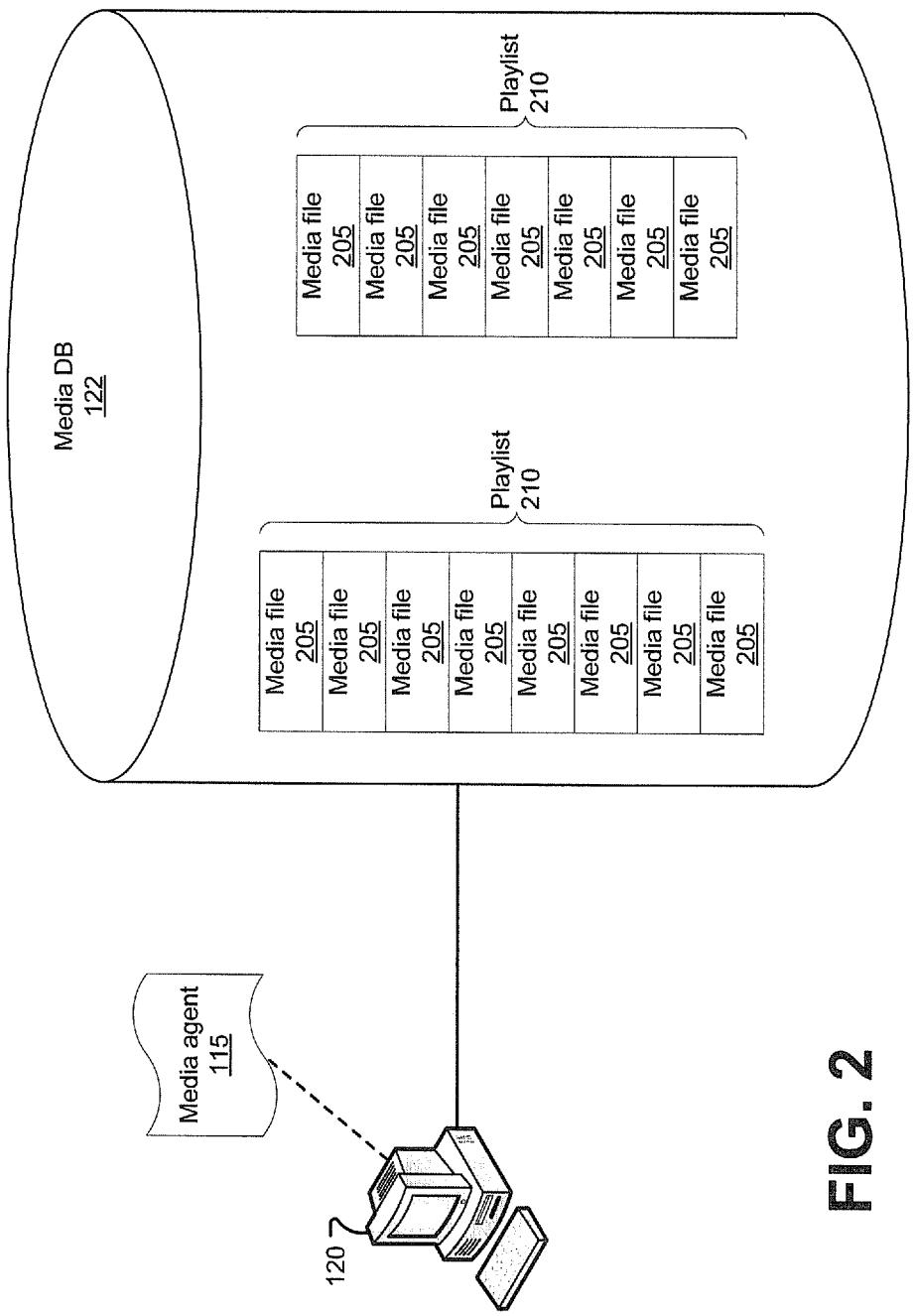
FIG. 2 illustrates certain details of an exemplary media database.

FIG. 2 illustrates certain details of an exemplary media database 122, which is associated with, possibly included within, computing device 120. Media database 122 includes a plurality of media files 205. Media files 205 may include files of a variety of types, such as audio files, image files, video files, etc. in a variety of formats, such as MP3, WAV, JPEG, GIF, PNG, MPEG, etc. Media files 205 may be accessible through a filesystem of computer 120, as objects in a relational data store included within our associated with computer 120, or according to some other mechanism for storing and accessing data such as media files 205.

One or more media files 205 may be organized into a playlist 210. Still image files and audio files are types of files commonly organized into playlists 210. Still image files organized into playlists 210 are sometimes referred to as slideshows. While the term "playlist" is most commonly associated with sets of audio files, that term is used herein also to refer to other types of media files 205, such as still image files. Playlists are discussed in more detail in the co-pending application entitled "MEDIA MANAGER" mentioned above. In general, a playlist 210 includes, in addition to one or more media files 205, metadata identifying the one or more media files 205 and an order in which such files 205 should be played or displayed. Metadata may be in a variety of formats, such as binary, eXtensible Markup Language (XML), etc. Metadata may differ for different types of media files 205. For example, for playlists 210 of still images, metadata may include file size, file location in database 122, date created, date modified, etc. For playlists 210 of audio files, metadata may include information such as an album name, an artist name, genre, bit rate, duration, etc. A playlist 210 may also include metadata to implement other rules, such as rules specifying that one or more media files 205 should be repeated, that media files 205 in the playlist 210 should be shuffled when played or displayed, etc. when a user specifies that a playlist 210 is to be executed, the media file or files 205 included in the playlist 210 are played or displayed as specified in the metadata associated with or included in the playlist 210.

In general, a user of content processing device 110, e.g., according to a graphical user interface (GUI) displayed on playback device 125, and using control 111, may access media files 205 and/or playlists 210. Further, as described in more detail below, a user may specify the generation of a package of media files 205 by specifying first and second playlists 210 that each include media files 205 of a different type. Of course, a package of media files 205 could be generated by specifying first and second playlists 210 that each included media files 205 of a same type. However, it is generally not desirable to play multiple media files 205 of the same type, e.g., multiple audio files, generally simultaneously through playback device 125. On the other hand, generating a package of media files 205 including files 205 of a first type and also files 205 of a second type advantageously makes it possible for files 205 of a first media type, e.g., audio files, to accompany files 205 of a second media type, e.g., image files, when played back through playback device 125 associated with content processing device 110.

Figure 3:
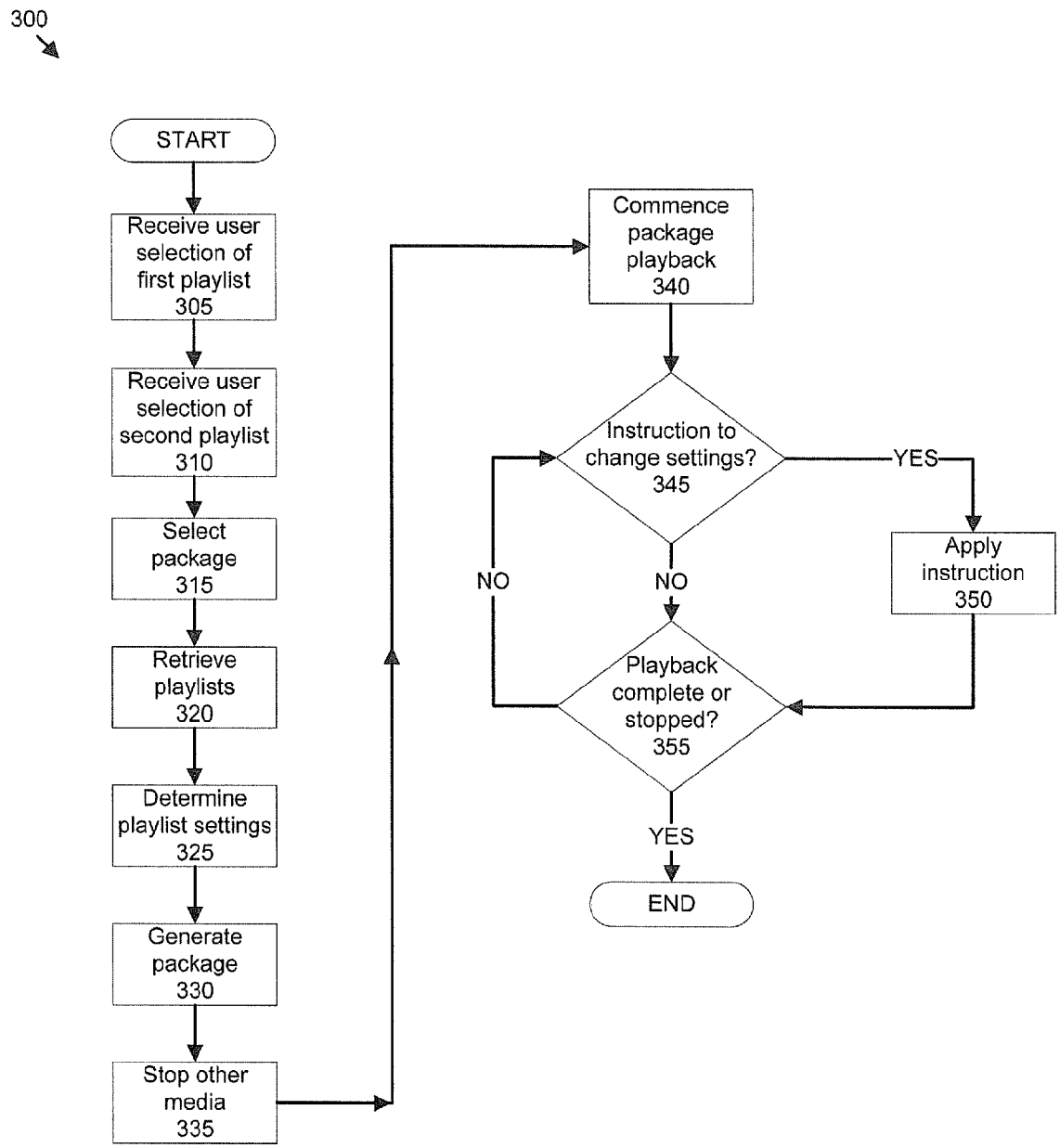
FIG. 3 illustrates an exemplary process for providing a media package for playback.

FIG. 3 illustrates an exemplary process 300 for providing a media package for playback.

Process 300 may begin in step 305, wherein a user of computing device 120 selects a first playlist 210 for inclusion in a package of media files 205. Computing device 120 generally has stored therein program instructions, e.g., included in media agent 115, for receiving such user selection, including program instructions for creating a GUI whereby a user may make such a selection. As discussed further below, metadata concerning playlists 210 is generally stored in association with each playlist 210 and generally includes the identity and/or descriptions of media files 205 included within each playlist 210, as well as an identifier and/or description for the playlist 210. Computing device 120 may access playlist 210 metadata to provide users with a list of playlists 210 that may be included in a package of media files.

Next, in step 310, media manager 105 receives a user selection of a second playlist 210. Because it is generally not desirable to have first and second playlists 210 included in a package of media files 205 unless the first and second playlists 210 include media files 205 of different types, the GUI may only display playlists 210 in step 310 to include media files 205 of a different type than media files included in the playlist 210 selected in step 305. Alternatively, if a user selects a playlist 210 including files 205 of the same type as files 205 in the playlist 210 selected in step 305, the GUI may display an error message or the like in playback device 125 informing the user that the selected playlist 210 may not be used, asking the user to make another selection, etc.

It is to be noted that the selections described above with respect to steps 305 and 310 could also be made according to program instructions included in media manager 105 and via a GUI provided by media manager 105, e.g., via control 111. For example, media manager 105 could retrieve a list of available playlists 210 from one or more computing devices 120 and/or databases 122, and provide such playlists 210 for user selection in a GUI.

In step 315, a user selects a package of media files 210 for playback. Such a selection may be made, for example, through input from control 111 in response to options in a GUI displayed in playback device 125 by media manager 105. Alternatively, a user may select a first playlist 210, whereby a package of media files 205 including a second playlist 210 is selected based on an association between the first and second playlists 210 included in metadata of the first playlist 210.

Next, in step 320, media manager 105 retrieves requested playlists 210 from one or more media databases 122 on one or more computing devices 120. Media manager 105 generally communicates with computing devices 120 on a network such as LAN within customer premises 101, e.g., through router 112. By communicating with computing devices 120, media manager 105 stores information concerning playlists 210 and/or packages of media files 205 available from each computing device 120 within customer premises 101.

Further, media manager 105 generally provides a GUI for display in playback device 125. A user may provide input in response to the GUI by using control 111. Accordingly, media manager 105 may provide a GUI listing one or more playlists 210, allowing a user to select one of the playlists 210 for inclusion in a package of media files 205. In general, a user selecting a playlist 210 for inclusion in a package of media files 205 will have selected an option in the GUI to create the package of media files 205, i.e., the playlist 210 will be selected for the purpose of inclusion in a package of media files 205. Of course, it is also possible that a user may select a playlist 210 through the GUI and then select an option to include the playlist 210 in a package of media files 205. Further, it is possible that metadata of a first playlist 210 may indicate an association with a second playlist 210, whereby selection of the first playlist 210 will automatically invoke playback of a package of media files including the first and second playlists 210.

As mentioned above, customer premises 101 will often include multiple computing devices 120 accessible through a LAN, e.g., via router 112, having databases 122 that include one or more playlists 210. Thus, as mentioned above, media manager 105 generally communicates with one or more computing devices 120 in customer premises 101. Accordingly, media manager 105 queries computing devices 120 as appropriate to retrieve playlists 210 and media files 205 included in the playlist 210, from one or more media databases 122. Additionally or alternatively, retrieval of a playlist 210 may include retrieval of metadata for a playlist 210 including file path information or other information identifying a database location of each file 210 in the playlist 210. Files 205 in a playlist 210 may then be streamed from a computing device 120 to content processing device 110, which in turn may decode the files 205 for playback in playback device 125. Streaming files 205 from computing devices 120, rather than downloading files 205 and storing them in content processing device 110, may be necessary or advantageous in situations where, as is often the case, content processing device 110 includes relatively small amounts of memory and/or other storage. Playlists 210 may be provided from computing devices 120 in any of a variety of manners, e.g., by media agent 115 in a manner described in co-pending application entitled "MEDIA MANAGER," mentioned above.

Next, in step 325, media manager 105 analyzes metadata for each of the first and second requested playlists 210 to determine settings for each playlist 210. Settings for a playlist 210 may include various items of metadata such as those mentioned above, e.g., in order for playback of media files 205 included in the playlist 210, instructions for playback such as instructions for shuffling or repeating certain files 205, etc.

Next, in step 330, media manager 105 generates a package of media files 205 including files 205 from each of the first and second playlists 210 selected respectively in steps 305 and 310, described above. Generation of a package of media files 205 generally involves no more than identifying the first and second playlists 210 including files 205 to be played at a same time, i.e., associating the playlists 210 with one another for playback, as described further below. Accordingly, a package of media files 205 generally exists as metadata created by media manager 105 in memory of content processing device 110 identifying first and second sets of media files 205, associated with first and second playlists 210, to be played at a same time. As noted above, playlists 210, and media files 205 included in a playlist 210, need to be all included in a database 122 associated with a single computing device 120, but may rather be retrieved or streamed from multiple computing devices 120. Further, such computing devices are often within customer premises 101. However, it is possible that a computing device 120 may be accessed through an external network, e.g., network 160, to obtain a playlist 210 and/or media file 205.

Next, in step 335, media manager 105 provides instruction to content processing device 110 to stop playback of any other media that may be playing to content processing device 110. For example, a content server such as content server 170 may be providing video on demand services, interactive program guide, etc. Further, content processing device 110 may be providing, to media playback device 125, media signal 140 received through media distribution network 150. Generally it is not desirable to have such other content playing at a same time as media files 205. Of course, step 335 may not be necessary, because other content may not be playing through content processing device 110 when a package of media files 205 is requested.

Next, in step 340, media manager 105 begins providing the package of media files 105 generated in step 330 to playback device 125 for playback. Media files 105 provided in a package are generally provided according to playlist 210 metadata, e.g., as determined in step 320 described above. Providing a package of media files 105 for playback generally includes executing two playlists 210 at a same time, i.e., the first playlist 210 selected in step 305 that includes a first set of media files 105, and the second playlist 210 selected in step 210 that includes a second set of media files 105. For example, the first set of media files 105 may be still image files, and a second set of media files 105 may be audio files, whereby providing the package of media files 105 for playback results in displaying a predetermined series of images accompanied by a predetermined set of audio files.

Next, in step 345, media manager 105 determines whether one or more instructions have been received, i.e., from a user of control 111, to alter any of the settings governing playback of media files 105. For example, a user could provide instruction pause playback of a first playlist 210 (while allowing playback of a second playlist 210 to continue), to repeat a particular audio file, to shuffle audio files in a first playlist 210, to stop execution of a first playlist 210 but continue execution of a second playlist 210, to repeat or shuffle both playlists 210, etc. if such an instruction has not been received, step 355 is executed next. However, if a user instruction or input has been received to change playback settings, then step 350 is executed next.

In step 350, media manager 105 applies the instruction or instructions received in step 342 playback of media files 105. Step 350 is executed following step 345.

In step 355, media manager 105 determines whether playback of media files 105 in a package is complete, or has been stopped, e.g., because of a user instruction received through control 111 to stop playback of media files 105. If playback of media files 105 is complete or has been stopped, process 300 ends. Otherwise, process 300 returns to step 340.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the fill scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
    receiving, by a device, a first selection of a first set of media files,
        the first set of media files being of a first type;
    receiving, by the device, a second selection of a second set of media files;
    determining, by the device, that the second set of media files is of a same type as the first type of the first set of media files;
    providing, by the device and for display, information indicating that the second set of media files cannot be used based on the second set of media files being of the same type as the first type of the first set of media files;
    receiving, by the device, a third selection of a third set of media files,
        the third set of media files being of a second type, and
        the second type being different from the first type;
    receiving, by the device, a request to create a package of media files;
    retrieving, by the device, the first set of media files and the third set of media files;
    generate, by the device and after receiving the request, the package of media files based on the first set of media files and the third set of media files; and
    providing the package of media files to a media playback device for the media playback device to play at least some of the first set of media files while simultaneously playing at least some of the third set of media files.

2. The method of claim 1, where retrieving the first set of media files and the third set of media files includes:
    retrieving, via a local area network or a wide area network, the first set of media files and the third set of media files from one or more computing devices.

3. The method of claim 1, where the media playback device is a television.

4. The method of claim 1, further comprising:
receiving an instruction regarding playing of the at least some of the first set of media files; and
applying the instruction to playing the at least some of the first set of media files without applying the instruction to the playing of the at least some of the third set of media files.

5. The method of claim 1, where retrieving the first set of media files and the third set of media files includes:
accessing a first computing device to retrieve the first set of media files; and
accessing a second computing device to retrieve the third set of media files.

6. The method of claim 1, where generating the package of media files includes:
generating the package of media files based on the first set of media files, the third set of media files, and metadata of the first set of media files that indicates an association of the first set of media files with the third set of media files.

7. The method of claim 1,
where the first set of media files includes image files or video files, and
where the third set of media files includes audio files.

8. The method of claim 1, further comprising:
providing, before providing the package of media files and to the media playback device, instructions for the media playback device to stop playing other media.

9. The method of claim 4, where the instruction is one of an instruction to shuffle the at least some of the first set of media files or an instruction to repeat one or more media files of the at least some of the first set of media files.

10. A system comprising:
a processor to:
receive a first selection of a first set of media files,
the first set of media files being of a first type,
receive a second selection of a second set of media files,
determine that the second set of media files is of a same type as the first type of the first set of media files,
provide, for display, information indicating that the second set of media files cannot be used based on the second set of media files being of the same type as the first type of the first set of media files,
receive a third selection of a third set of media files,
the third set of media files being of a second type, and the second type being different from the first type,
retrieve the first set of media files and the third set of media files,
generate a package of media files based on the first set of media files and the third set of media files, and
provide the package of media files to a media playback device for the media playback device to play at least a first media file of the first set of media files while simultaneously playing at least a second media file of the third set of media files.

11. The system of claim 10, where, when retrieving the first set of media files and the third set of media files, the processor is to:
retrieve the first set of media files and the third set of media files via a local area network or a wide area network.

12. The system of claim 10, where the media playback device is a television.

13. The system of claim 10, where the processor is further to:
receive an instruction regarding playing one or more media files of the third set of media files,
the one or more media files of the third set of media files including the second media file; and
apply the instruction regarding playing the one or more media files of the third set of media files without applying the instruction to playing one or more other media files of the first set of media files,
the one or more other media files of the first set of media files including the first media file.

14. The system of claim 10, where, when retrieving the first set of media files and the third set of media files, the processor is to:
access a first computing device to retrieve the first set of media files; and
access a second computing device to retrieve the third set of media files.

15. The system of claim 10, where, when generating the package of media files, the processor is to:
create the package of media files based on the first set of media files, the third set of media files, and metadata of the first set of media files that indicates an association of the first set of media files with the third set of media files.

16. The system of claim 10,
where the first set of media files includes images or video, and
where the third set of media files includes audio.

17. The system of claim 10, where the processor is further to:
provide, before providing the package of media files and to the media playback device, instructions to stop the media playback device from playing other media.

18. The system of claim 13, where the instruction is one of:
an instruction to shuffle the one or more media files of the third set of media files, or
an instruction to repeat one or more particular files of the one or more media files of the third set of media files.

19. A non-transitory computer-readable medium storing instructions, the instructions comprising:
one or more instructions that, when executed by at least one device, cause the at least one device to:
receive a first selection of a first set of media files,
the first set of media files being of a first type;
receive a second selection a second set of media files,
determine that the second set of media files is of a same type as the first type of the first set of media files,
provide, for display, information indicating that the second set of media files cannot be used based on the second set of media files being of the same type as the first type of the first set of media files,
receive a third selection of a third set of media files,
the third set of media files being of a second type, and the first type being different from the second type;
receive a request to create a package of media files;
retrieve the first set of media files and the third set of media files;
generate, by the device and after receiving the request, the package of media files based on the first set of media files and the third set of media files; and
provide the package of media files to a media playback device for the media playback device to play one or more first media files of the first set of media files while simultaneously playing one or more second media files of the third set of media files.

20. The non-transitory computer-readable medium of claim 19, where the one or more instructions to receive the request to create the package of media files include:

one or more instructions that, when executed by the at least one device, cause the at least one device to:
provide, to the media playback device, an interface to be displayed by the media playback device,
receive, via the interface, a fourth selection of a first option to create the package of media files, and
receive, via the interface, a fifth selection of a second option to include the first set of media files in the package of media files.

* * * * *